United States Patent
Tuzel et al.

(10) Patent No.: US 9,280,827 B2
(45) Date of Patent: Mar. 8, 2016

(54) METHOD FOR DETERMINING OBJECT POSES USING WEIGHTED FEATURES

(71) Applicant: Mitsubishi Electric Research Laboratories, Inc., Cambridge, MA (US)

(72) Inventors: Oncel Tuzel, Winchester, MA (US); Ming-Yu Liu, Cambridge, MA (US); Yuichi Taguchi, Arlington, MA (US); Arvind U Raghunathan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 386 days.

(21) Appl. No.: 13/934,315

(22) Filed: Jul. 3, 2013

(65) Prior Publication Data
US 2015/0010202 A1    Jan. 8, 2015

(51) Int. Cl.
*G06K 9/00* (2006.01)
*G06T 7/00* (2006.01)

(52) U.S. Cl.
CPC .......... *G06T 7/0046* (2013.01); *G06K 9/00201* (2013.01); *G06T 2207/10028* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 6,173,070 B1 | 1/2001 | Michael et al. | |
| 8,774,504 B1 * | 7/2014 | Sundareswara | G06K 9/00201 382/165 |
| 2010/0278384 A1 | 11/2010 | Shotton | |
| 2011/0273442 A1 | 11/2011 | Drost | |
| 2012/0230592 A1 * | 9/2012 | Iwamura | G06K 9/3283 382/201 |
| 2013/0156262 A1 | 6/2013 | Taguchi et al. | |
| 2013/0245828 A1 * | 9/2013 | Tateno | B25J 9/1697 700/259 |

FOREIGN PATENT DOCUMENTS

| | | |
|---|---|---|
| JP | WO2012023593 A1 | 2/2012 |
| WO | WO2010019925 A1 | 2/2010 |

OTHER PUBLICATIONS

B. Drost, M. Ulrich, N. Navab, and S. Ilic. Model globally, match locally: Efficient and robust 3D object recognition. In Proc. IEEE Conf. Computer Vision and Pattern Recognition (CVPR), pp. 998-1005, Jun. 2010.

J. Shotton, A. Fitzgibbon, M. Cook, T. Sharp, M. Finocchio, R. Moore, A. Kipman, and A. Blake. Real-time human pose recognition in parts from single depth images. In Proc. IEEE Conf. Computer Vision and Pattern Recognition (CVPR), pp. 1297-1304, Jun. 2011.

C. Choi, Y. Taguchi, O. Tuzel, M.-Y. Liu, and S. Ramalingam. Voting-based pose estimation for robotic assembly using a 3D sensor. In Proc. IEEE Int'l Conf. Robotics Automation (ICRA), pp. 1724-1731, May 2012.

A. E. Johnson and M. Hebert. Using spin images for efficient object recognition in cluttered 3D scenes. IEEE Trans. Pattern Anal. Mach. Intell., 21(5):433-449, May 1999.

F. Stein and G. Medioni. Structural indexing: Efficient 3-D object recognition. IEEE Trans. Pattern Anal. Mach. Intell., 14(2):125-145, Feb. 1992.

* cited by examiner

*Primary Examiner* — Jason Heidemann
(74) *Attorney, Agent, or Firm* — Dirk Brinkman; Gene Vinokur

(57) ABSTRACT

A method for determining a pose of an object in a scene by determining a set of scene features from data acquired of the scene and matching the scene features to model features to generate weighted candidate poses when the scene feature matches one of the model features, wherein the weight of the candidate pose is proportional to the model weight. Then, the pose of the object is determined from the candidate poses based on the weights.

18 Claims, 6 Drawing Sheets

1: Input: Sampled 3D scenes and corresponding true poses: $\{(I_i, y_i^*)\}_{i=1...N}$
2: Initialize $w^0 = 1^M$, empty constraint set $x_{i,j}^{(0)} = \{\}$. $k = 1$
3: while $k \leq$ *max iteration* do
4:    For each scene $I_i$ solve pose estimation (Section 2) using weights $w^{(k-1)}$
5:    For all the likely poses compute most violated constraints using (7). Let $x_{i,j}^{(k)}$ and $y_{i,j}^{(k)}$ be the set of most violated constraints and corresponding poses. If this list is empty break
6:    Add most violated constraints to the constraint list $x_{i,j}^{(1:k)} = x_{i,j}^{(1:k-1)} \cup x_{i,j}^{(k)}$
7:    Solve optimization problem (8) using constraint set $x_{i,j}^{(1:k)}$ to get new weights $w^{(k)}$. $k = k + 1$
8: end while
9: Output: Learned weight vector $w$

*Fig. 3*

METHOD FOR DETERMINING OBJECT POSES USING WEIGHTED FEATURES

FIELD OF THE INVENTION

This invention relates generally to estimating poses of 3D objects, and more particularly to estimating poses from data acquired by 3D sensors.

BACKGROUND OF THE INVENTION

A frequent problem in computer vision applications is to determine poses of objects in 3D scenes from scene data acquired by 3D sensors based on structured light or time of flight. Pose estimation methods typically require identification and matching of scene measurements with a known model of the object.

Some methods are based on selecting relevant points in a 3D point cloud and using feature representations that can invariantly describe regions near the points. Those methods produce successful results when the shape of the object is detailed, and the scene measurements have a high resolution and little noise. However, under less ideal conditions, the accuracy of those methods decreases rapidly. The 3D measurements can include many hidden surfaces due to imaging from a single viewpoint with the sensor, which makes a detailed region representation unavailable. Noise and background clutter further affect the accuracy of those methods.

A set of pair features can be use for detection and pose estimation. Pairs of oriented points on a surface of an object are used in a voting framework for pose estimation, e.g., see U.S. Publication 20110273442. Even though the descriptor associated with the pair feature is not very discriminative, that method can produce accurate results even when subject to moderate occlusion and background clutters by accumulating measurements for a large number of pairs. That framework can benefit from a hashing and Hough voting scheme.

Other methods model 3D shapes globally by using 2D and 3D contours, shape templates, and feature histograms. In general, global methods require the object to be isolated because those methods are sensitive to occlusion. Also, changes in appearance due to pose variations necessitates the use of a large number of shape templates, which has the drawback of increased memory and processing time. A learning-based keypoint detector that uses range data to decrease processing time is described in U.S. Publication 20100278384.

SUMMARY OF THE INVENTION

The embodiments of the invention provide a method for determining poses of three-dimensional (3D) objects in a scene using weighted model features.

During online operation, scene features are determined from 3D data acquired of the scene by a 3D sensor. The scene features are matched to model features acquired during offline training. The matching generates weighted candidate poses. The weights of candidate poses are proportional to the weights of the model features that match the scene features. Then, the candidate poses are merged by clustering the poses. The pose of the object is determined according to the weights of the merged poses.

In some embodiments, the model and scene features are oriented point pair features. The invention is based on the realization that not all the pairs of points have similar discriminative power, or repeatability. In fact, certain features do not carry any relevant information for pose estimation, hence the model features can be selected sparsely and weighted according to their importance.

BRIEF DESCRIPTION OF THE FIGURES

FIG. 3 is a block diagram of pseudocode of learning model features and weights according to some embodiments of the invention;

DETAILED DESCRIPTION OF THE PREFERRED EMBODIMENTS

Robotic Bin Picking Application

Figure 1A:
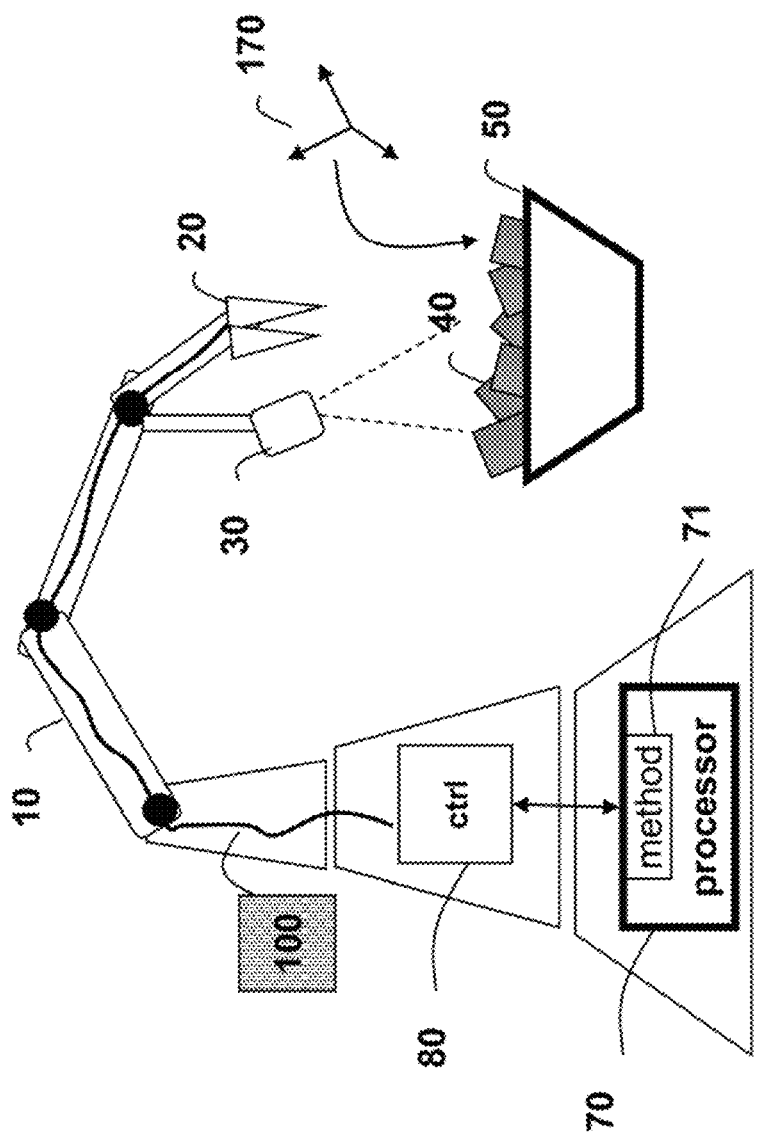
FIG. 1A is a schematic of a robotic assembly apparatus that can use the embodiments of the invention.

FIG. 1A shows a system for estimating a pose of an object. The goal is to pick objects 40 from a bin 50 based on their poses 170. The system includes a 6-axis robotic arm 10 with a gripper 20. A 3D sensor 30 is arranged on the arm to acquire data of the scene. Then, the gripper picks the objects from a bin depending on their poses. It should be noted that the bin can contain different objects.

One example 3D sensor uses structured light generated by a projector. Other sensors, such as stereo cameras and time-of-flight range sensors are also possible. The sensor acquires 3D scene data 100, e.g., a point cloud. The 3D sensor is calibrated with respect to the robot arm. Thus, the poses of the objects estimated in a coordinate system of the 3D sensor can be transformed to a coordinate system of the robotic arm, allowing grasping and picking of the objects by controlling 80 the robotic arm according to the poses. The scene data are processed by a method 71 performed in a processor 70. The processor can include memory and input/output interfaces as known in the art.

Point Pair Features

In some embodiments, the pose estimation method uses point pair features. Each point pair feature can be defined using two points on a surface of the object, and normal directions of the surface at the points, which is called a surface-to-surface (S2S) pair feature. The feature can also be defined using a point on the surface and its normal and another point on an object boundary and direction of this boundary, which is called a surface-to-boundary (S2B) pair feature. The feature can also be defined using two points on the object boundary and their directions, which is called a boundary-to-boundary (B2B) pair feature.

Figure 4:
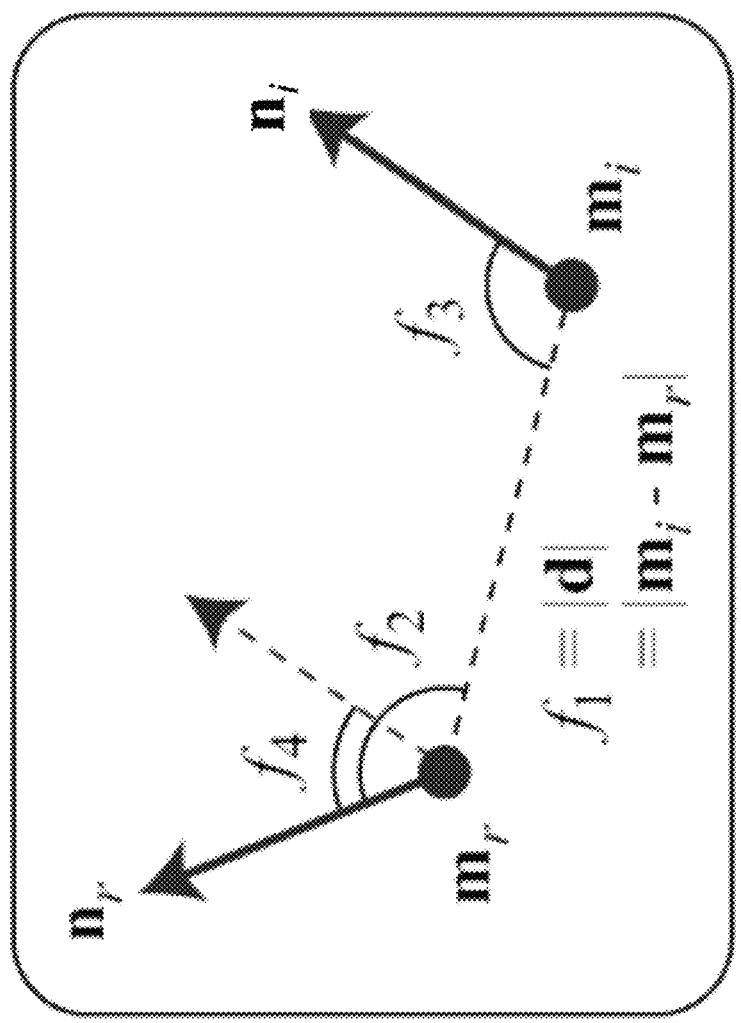
FIG. 4 is a schematic of the descriptor constructed from a pair feature according to some embodiments of the invention.

As shown in FIG. 4, let $\vec{m}_r$ and $\vec{m}_i$ be the point pair, and $\vec{n}_r$ and $\vec{n}_i$ the orientations at the points, e.g., normals or boundary directions, of the two points in the point pair. We refer to the first point $\vec{m}_r$ as a reference point and the second point $\vec{m}_i$ as a referred point. A descriptor of the point pair feature is $$\vec{F}(\vec{m}_r, \vec{m}_i) = (f_1, f_2, f_3, f_4) \tag{1}$$

$$= (\|\vec{d}\|_2, \angle(\vec{n}_r, \vec{d}), \angle(\vec{n}_i, \vec{d}), \angle(\vec{n}_r, \vec{n}_i)),$$

where $\vec{d} = \vec{m}_i - \vec{m}_r$ is the displacement vector between the two points. The 4D descriptor is defined by: the distance ($f_1 = \|d\|$) between the points $m_r$ and $m_i$ and angles ($f_2$, $f_3$, $f_4$). The angle $f_2$ is between the displacement vector d and the normal vector $n_r$, the angle $f_3$ is between d and the vector $n_i$, and the angle $f_4$ is between the vectors $n_r$ and $n_i$. This descriptor is pose invariant.

In other embodiments, the method uses other 3D features such as a spin image, or 3D scale-invariant feature transform (SIFT) image. The spin image is a surface representation that can be used for surface matching and object recognition in 3D scenes. The spin images encodes global properties of the surface in an object-oriented coordinate system, rather than in a viewer-oriented coordinate system. The SIFT image features provide a set of features that are not affected by object scaling and rotation.

Pose Determination

Figure 1B:
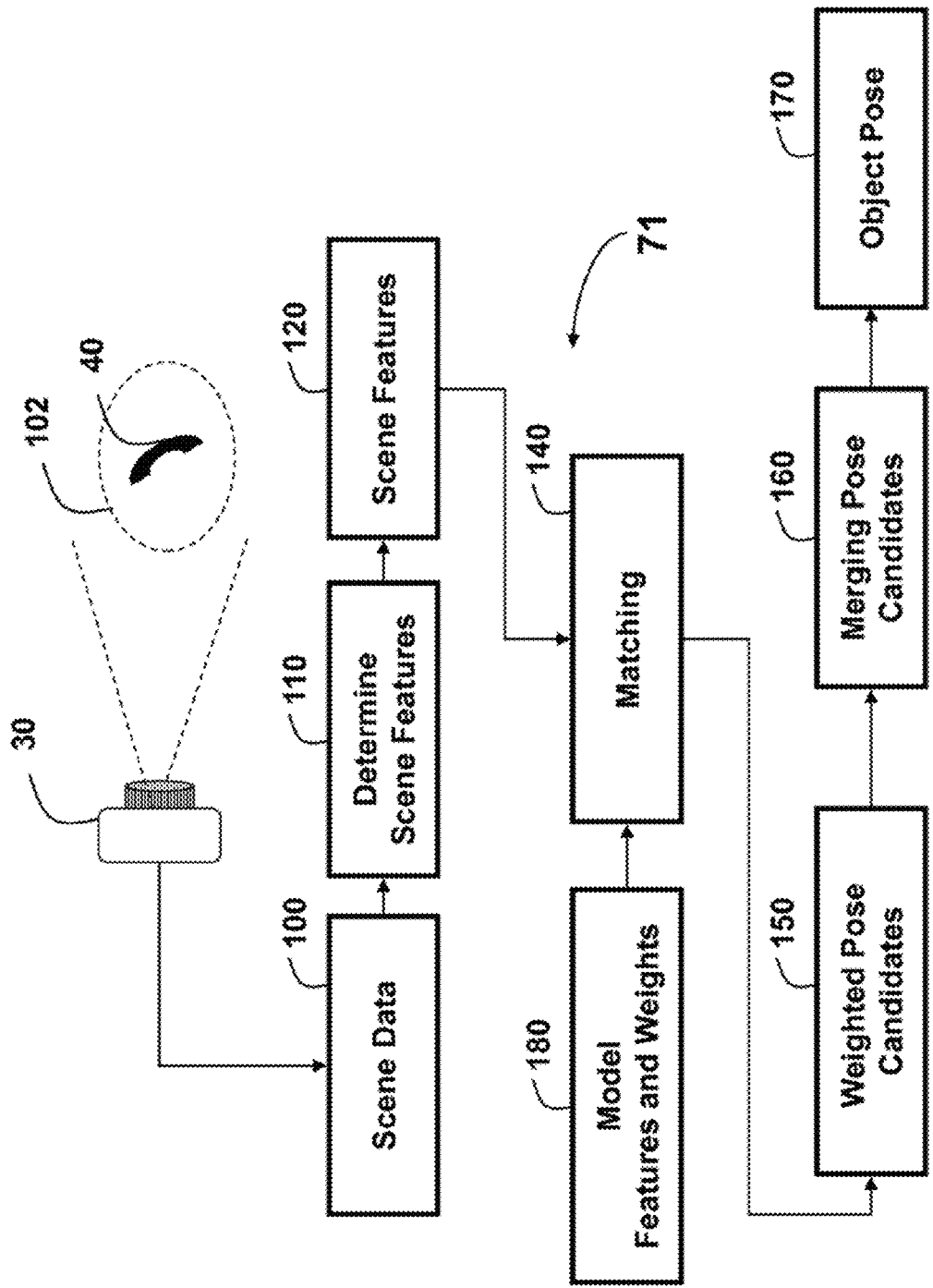
FIG. 1B is a block diagram of a method for pose estimation in the apparatus of FIG. 1A according to the embodiments of the invention.

As shown in FIG. 1B, the embodiments of our invention provide the method 71 for determining the pose 170 of the object 40 in a scene 102. The 3D scene data (measurements) 100 are acquired by the sensor 30. Scene features 120 are determined 110 by selecting several point pairs in the scene. For each scene feature, a descriptor is constructed, see Equation above (1).

For the purpose of this description, the features used during online processing are referred to as scene features 120. The features learned during offline training are referred to as model features 180.

Figure 2:
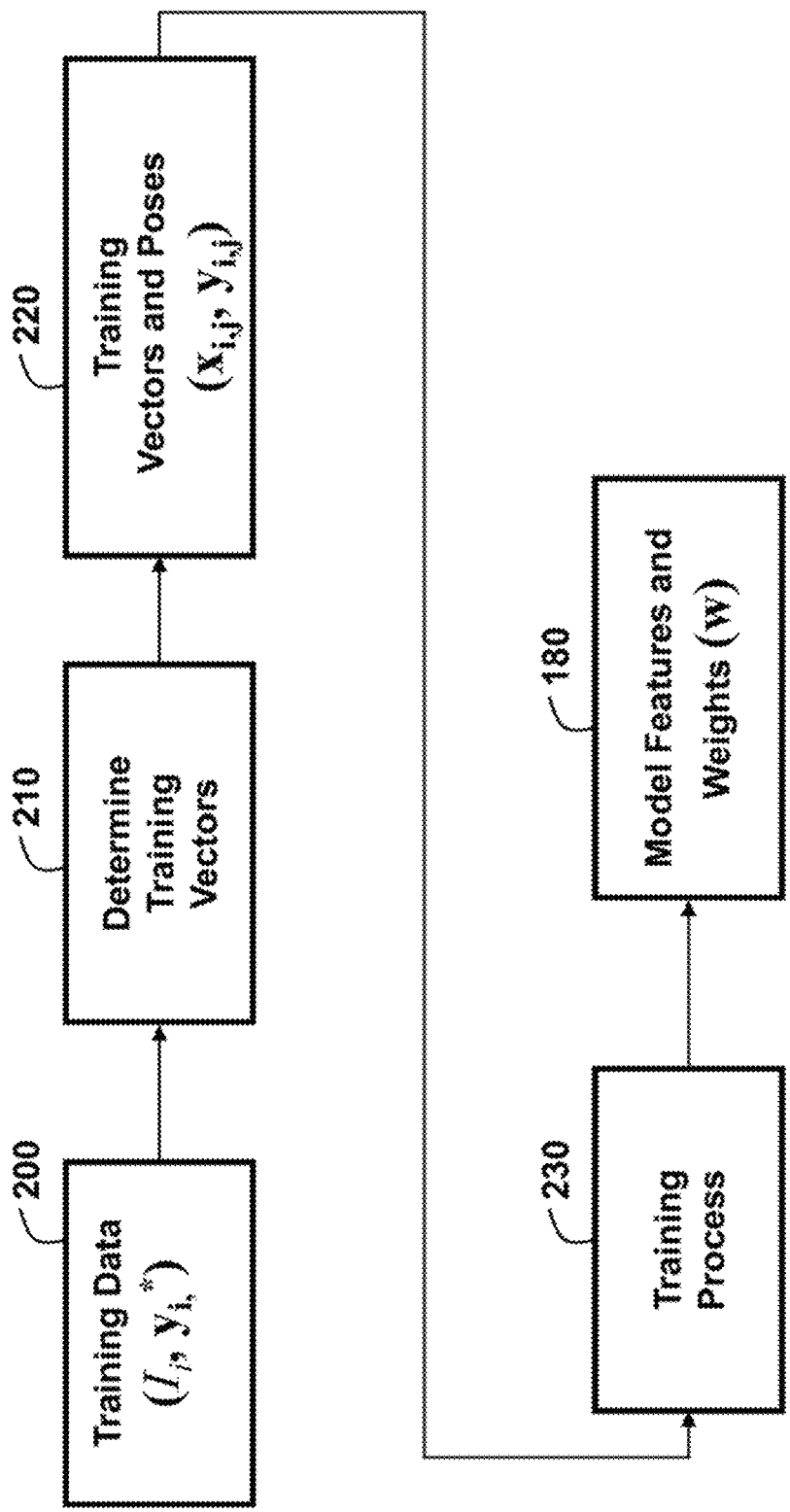
FIG. 2 is a block diagram of a procedure for learning model features and weights according to some embodiments of the invention.

As shown in FIG. 2, the model features 180 are determined from a 3D model of the object. Each model feature is associated with a weight which is also learned during training. It is also noted that the way the scene and model features are extracted and constructed in descriptor vectors is identical during offline training and online operation. Hence, when we refer to the feature in general we mean both the scene and model features.

As shown in FIG. 1, the scene feature is matched 140 with the model features 180 using a distance function. The distance function can be any function that determines the distance between the two descriptor vectors, such as a Euclidean distance, an $L_1$ distance or a Hamming distance on a quantization of features. If the distance of the descriptors is less than a predetermined threshold, then the features match. The matched features and their orientations are aligned in 3D space. Each matched feature generates a weighted candidate pose 150 where the weight is proportional to model feature weight. In some embodiments, the model features and their weights are determined using a training process 230 shown in FIG. 2.

The candidate poses are merged 160 by clustering. If two candidate poses are closer than a clustering threshold, then the candidate poses are combined into a single candidate pose by taking a weighted sum of the two candidate poses. Clustering is repeated until no two candidate poses are closer than the clustering threshold. Then, the object pose 170 is the candidate pose that has a weight larger than a threshold.

Training

FIG. 2 shows a method for learning the model features and their weights 180 using training data 200. The training data include a set of 3D scenes and ground truth poses of the objects in the set of scenes. The training data can be collected by scanning real 3D scenes and manually labeling object poses, or from rendering computer aided design (CAD) models of the objects at various poses (ground truth). For each training scene, training vectors 220 are determined 210 for a training process 230. The method provides a set of model features that are "discriminative" and their weights 180 according to their importance for the pose determination task.

Determining Features and Weights

The pose of the object is the candidate pose with a maximal weight among all the candidate poses. The goal of the learning is to select and weight the model features to ensure that the correct pose receives more weights than other poses.

Weighting Schemes

There are several different ways of weighting the features. The simplest form is based on assigning each model point pair with a different weight, and any scene point pair feature that matches to a given model point pair feature generates a candidate pose equal to this weight. Although this weighting scheme is very general, learning is very underdetermined due to a high dimensional weight space.

Alternatively, we can group sets of features to have the same weights. One such strategy is weighting using quantization of the model feature descriptors. A single weight is defined for all the model point pair features that have the same quantized descriptor m. Any scene point pair feature that is matched to the same quantized descriptor generates a candidate pose that is proportional to this weight. Because the point pairs are grouped into clusters that are mapping to the same quantized descriptor, a dimension of the weight space is reduced to the number of quantization levels M.

An important advantage of this method is that it is possible to learn a weight vector that is sparse. As used herein, sparse is not a relative term. In the art of numerical analysis, sparsity refers to data where most elements are zero. In such cases, the method immediately removes any scene features mapping to a quantized descriptor with zero weight. This reduces processing time significantly.

A second grouping strategy is based on weighting model points. The weight is defined for each model point. Any scene pair that maps to either first or second point of the pair generates candidate poses with this weight. This approach significantly reduces the dimension of the weight space, allowing efficient learning, and directly identifies important points on the model surface.

Given data in the form of a 3D point cloud of a scene containing the object, let S be the set of all scene pair features that are determined from this scene. Without loss of generality, we use weighting using quantization scheme described above. Let $y \in SE(3)$ be a candidate pose. The corresponding training vector $x_y \in R^M$ is given by a mapping $\Phi$ of all the scene pair features that generates a pose y, $x = \Phi_y(S)$. When the correspondence is clear from the context, we do not use the subscript and write x instead of $x_y$.

For weighting using quantization, this mapping is given by the number of times a quantized descriptor m generates a pose y:

$$x^m = \Phi_y^m(S) \tag{2}$$

$$= \sum_{s \in S} \sum_{v \in y(s)} I_{(h(s) = m \& y = v)},$$

where $x^m$ is the $m^{th}$ dimension of training vector x, $I \in \{0,1\}$ is an indicator function and, y(s) is the set of poses that the pair s generates, and h(s) is the quantized descriptor of feature s. Note that, a pair s can generate multiple candidate poses.

The weight that a pose receives from all scene pair features can be written using the linear map $w^T x$, where w is an M-dimensional weight vector. When $w = 1_M$, this function is equivalent to a uniform weighting function.

Learning Weights

Let I be a 3D scene and y* be the pose of the object in the scene. The goal of learning weights is to determine a non-negative weight vector that satisfies the constraints $$w^T x^* > w^T x, \forall y \neq y^*, \forall I. \quad (3)$$

This means that for all the 3D scenes I, the true pose of the object y* should have more weight than any other pose.

To solve this problem, we use machine learning because a closed form solution is generally unavailable. Let $\{(I_i, y_i^*)\}_{i=1 \ldots N}$ be the training data 200 including N 3D scenes and ground truth poses of the object. For each training scene model, the features are determined. The constraints given in Equation (3) might not define a feasible set. Instead, we reformulate learning the weights as a regularized soft constraint optimization $$w^* = \underset{w}{\operatorname{argmin}} \sum_1 \xi_i + \lambda R(w), \quad (4)$$

s.t. (5)
$$w^T(x_i^* - x) \geq \Delta(y_i^*, y) - \xi_i, \forall i, \forall y \neq y_i^*,$$

$$w_u \geq w \geq 0, \quad (6)$$
$$\xi_i \geq 0,$$

where R(w) is a convex regularizer on the weight vector, λ is a tradeoff between margin and training error, and a loss function $\Delta(y_i^*, y)$ gives a larger penalty to large pose deviation. We also use an explicit upper bound $w_u$ on the maximal weight of a feature dimension.

We use a cutting plane method to find the weight vector. The cutting-plane method iteratively refines a feasible set or objective function by means of linear inequalities, called cuts.

At each iteration k of the learning process 230, we use the previous set of weights $w^{(k-1)}$ and solve the pose estimation problem for each scene $I_i$ using the pose estimation method. In addition to the best pose, this method provides the set of candidate poses, which are sorted according to the weights. For all candidate poses, we evaluate a margin constraint $$(w^{(k-1)})^T(x_i^* - x) \geq \Delta(y_i^*, y), \quad (7)$$

and add the most violated constraint to the selected constraint list. Let $y^{(1:k)}$ and $x^{(1:k)}$ be the set of all selected poses and constraints up to iteration k. Then, the optimization problem at iteration k is $$w^{(k)} = \underset{w}{\operatorname{argmin}} \sum_i \sum_j \xi_{i,j} + \lambda R(w), \quad (8)$$

s.t. (9)
$$w^T(x_i^* - x_{i,j}^{1:k}) \geq \Delta(y_i^*, y_{i,j}^{(1:k)}) - \xi_{i,j}, \forall i, j,$$

$$w_u \geq w \geq 0, \quad (10)$$
$$\xi_{i,j} \geq 0.$$

This optimization problem is convex and has a finite number of constraints, which we solve optimally. Note that, dimensionality of the training vectors can be large, e.g., $M \gg 10^5$. Fortunately, the training vectors are sparse. Therefore, the optimization can be solved efficiently using convex programming solvers and utilizing sparse matrices and sparse linear algebra.

In general, the method requires fewer iterations if multiple violated constraints are added to the supporting constraint set at a given time, leading to faster operation. We usually solve three or four iterations of the cutting plane method. We initialize with a uniform voting $w^{(0)} = 1_M$, which significantly speeds up the convergence of the method.

Pseudocode for the training method is shown in FIG. 3. The variables and steps used by the pseudo code are described in herein.

Implementation Details

Training Data

Pair features are invariant to the action of the group of 3D rigid motions SE(3). However, we only observe the scene from a single viewpoint, self occlusions, hidden surfaces and measurement noise play a major role in variability of the training vectors x. This variation is largely independent of the 3D translation and rotation of the object along the viewing direction, whereas in general the variation is very sensitive to out-of-plane rotation angles.

Therefore, we sample a set of 3D poses $\{y_i^*\}_{i=1 \ldots N}$, by regularly sampling along two axes of out-of-plane rotation angles on a unit sphere, and appending a random in-plane rotation angle and a translation vector. In addition we add few random objects to the scene to generate background clutter, and render the scene to generate the 3D point cloud.

Alternatively training data can be collected by scanning a real scene containing the target object using a range sensor. The true 6-degrees-of-freedom (DoF) pose of the object can be labeled manually.

Loss Function

We use a loss function $$\Delta(y, y_i) = 1 + \lambda_\theta \theta(y, y_i), \quad (11)$$

where $\theta(y, y_i) = \|\log(R_y^{-1} R_{y_i})\|_2$ is the geodesic distance between the two rotation matrices encoded in 6-DoF poses y and $y_i$. The constant 1 puts a fixed margin between two non identical poses and $\lambda_\theta$ is a weighting factor between fixed margin and its scaled counterpart, based on the orientation difference. We ignore translational component of pose y because the data are largely insensitive to translation as described above.

Regularization

The form of the regularization function plays an important role in accuracy and efficiency of the voting method. In some embodiments, we use a quadratic regularization function $R(w) = w^T w$. In other embodiments, we use $L_1$-norm regularizer $\|w\|_1$, which sparsifies the weight vector leading to sparse feature selection and fast operation.

Optimization of Pose Estimation Using Weighted Voting

Figure 5:
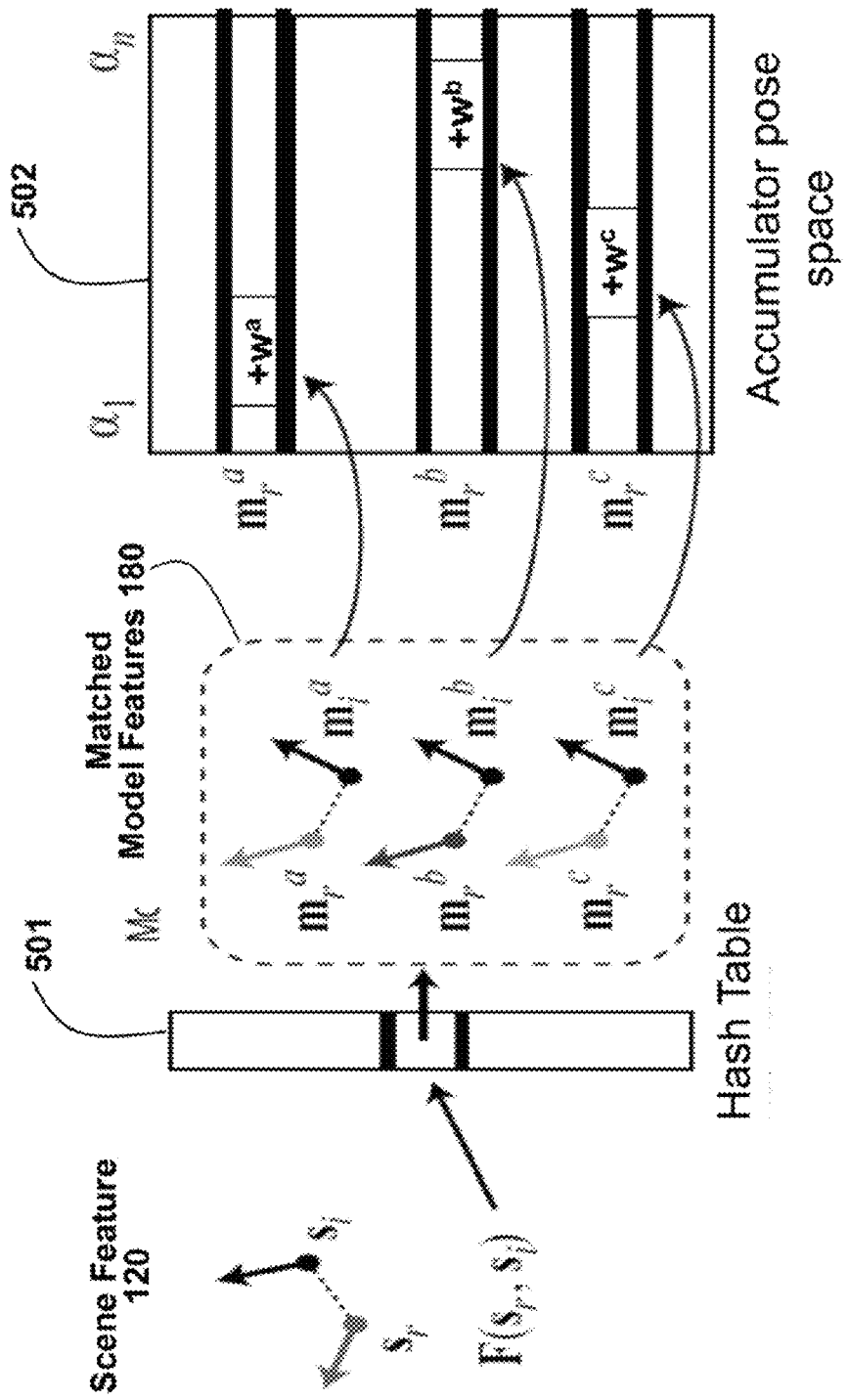
FIG. 5 is a schematic of the optimized pose estimation using weighted voting scheme according to some embodiments of the invention.

Pose estimation is optimized using a weighted voting scheme. FIG. 5 shows the voting scheme schematically. As shown in FIG. 4, the voting-based pose estimation uses, for example, point pair features $\{m_r, m_i\}$. The 4D descriptor ($f_1, f_2, f_3, f_4$) is defined above.

As shown in FIG. 5, the model point pair features {a, b, c} 180 are stored in a hash table 501 using their descriptors as the keys. Each scene point pair feature 120 is matched with multiple model point pair features using the hash table. Each matched model point pair feature votes for an entry in a 2D accumulator space 502, corresponding to a particular pose. The weights of the votes, e.g., $+w^a$, $+w^b$, and $+w^c$, are proportional to the weight of the model point pair feature.

The model pair features 180 are stored in the hash table in an offline process for efficiency. The quantized descriptors are served as the hash keys. During an online process, a scene reference point is selected and paired with another scene point to form the scene point pair feature 120. Its descriptor is then used to retrieve matched model point pair features 180 using the hash table. Each of the retrieved model point pair features in the hash bin votes for an entry in the 2D accumulator space.

Each entry in the accumulator space corresponds to a particular object pose. After votes are accumulated for the sampled reference scene point by pairing it with multiple sampled referred scene points, poses supported by a certain number of votes are retrieved. The process is repeated for different reference scene points. Finally, clustering is performed to the retrieved poses to collect support from several reference scene points.

Online Learning of Weights

In one embodiment, training of the model features and their weights are performed online using the robot arm 10. The scene data including the object are acquired using a 3D range sensor. The pose estimation procedure starts with uniform weights. After estimating the pose of the object in the scene, the pose is verified by picking the object from the bin. If the object is successfully picked from the bin, then the scene is added to the training set with the estimated pose as the true pose. If the estimated pose is incorrect, then the scene data are discarded. The scene is altered, e.g., by moving objects with the robot arm, and the process is repeated. The weights of the model features are learned using the generated training set during robot operation.

Application

In one application, as shown in FIG. 1A, the sensor is arranged on the robot arm with a gripper used for bin picking. We use the weighted voting procedure to determine several candidate poses, followed by an iterative closest point (ICP) process to refine each candidate pose. The matching score of the ICP process is used to rank the several candidates and decide how to pick a selected object.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a pose of an object in a scene, comprising the steps of:
   determining, from a model of the object, model features and a weight associated with each model feature, wherein the model features and the weights are learned using training data by maximizing a difference between a number of votes received by a true pose and a number of votes received by an incorrect pose, and wherein the weights are learned by solving a regularized soft constraint optimization problem;
   determining, from scene data acquired of the scene, scene features;
   matching the scene features to the model features to obtain a matching scene and matching model features;
   generating candidate poses from the matching scene and the matching model features, wherein a weight of each candidate pose is proportional to the weight associated with the matching model feature; and
   determining the pose of the object from the candidate poses based on the weights.

2. The method of claim 1, wherein a descriptor is determined for each feature and the matching uses a distance function of two descriptors.

3. The method of claim 2, wherein the descriptor is $$\vec{F}(\vec{m}_r, \vec{m}_i) = (f_1, f_2, f_3, f_4) = (\|\vec{d}\|_2, \angle(\vec{n}_r, \vec{d}), \angle(\vec{n}_i, \vec{d}), \angle(\vec{n}_r, \vec{n}_i)), \quad (1)$$

where $\vec{m}_r$ is a reference point, $\vec{m}_i$ is a feature points, $\vec{n}_r$ is an orientation at the reference point, $\vec{n}_i$ is an orientations of the feature point, $\vec{d} = \vec{m}_i - \vec{m}_r$ is a displacement vector between the reference point and the feature point, $f_1 = \|\vec{d}\|$ is a distance between the reference point and the feature points, $f_2$ is an angle between the displacement vector and the orientation of the reference point, $f_3$ is an angle between the displacement vector and the orientation of the feature point, and $f_4$ is an angle between the orientations of the reference point and the feature point.

4. The method of claim 1, wherein the features are oriented point pair features.

5. The method of claim 1, wherein the pose is determined by clustering the candidate poses.

6. The method of claim 5, wherein the clustering merges two candidate poses by taking a weighted sum of the candidate poses according to the weights associated with the candidate poses.

7. The method of claim 1, wherein the scene data are a 3D point cloud.

8. The method of claim 1, wherein the model features are stored in a hash table, the scene features are matched to the model features using keys into the hash table, and the weights are summed on an accumulator space, wherein each entry of the accumulator space corresponds to a particular object pose.

9. The method of claim 1, further comprising:
   picking the object out of a bin according to the pose using a robot arm.

10. The method of claim 9, wherein the model features and the weights are learned using training data acquired during the picking.

11. The method of claim 1, wherein training data are generated from a CAD model of the object and by sampling object poses and rendering the model according to the sampled object poses.

12. The method of claim 1, wherein training data are a 3D point cloud acquired using a range sensor and each object pose is labeled.

13. The method of claim 1, wherein the regularized soft constraint optimization problem uses a loss function to put a fixed margin between two non identical poses.

14. The method of claim 1, wherein the regularized soft constraint optimization problem uses a quadratic regularization function.

15. The method of claim 1, wherein the regularized soft constraint optimization problem uses a $L_1$-norm regularizer.

16. The method of claim 1, wherein the regularized soft constraint optimization problem has linear constraints.

17. An apparatus for determining a pose of an object in a scene, comprising:
   a robot arm;
   a sensor arranged on the robot arm, wherein the sensor is configured to acquire scene data; and
   a processor configured to
      determine scene features from the scene data,
      match the scene features to model features to obtain matching scene and model features, wherein each model feature is associated with a weight, wherein the model features and the weights are learned using training data by maximizing a difference between a number of votes received by a true pose and a number of votes received by an incorrect pose, and wherein the weights are learned by solving a regularized soft constraint optimization problem, generate candidate poses from the matching scene and model features, wherein a weight of each candidate pose is proportional to the weight associated with the matching model feature, and determine the pose of the object from the candidate poses based on the weights.

18. The apparatus of claim 17, further comprising:

a gripper mounted on the robot arm for picking the object according to the pose.

* * * * *